US009202526B2

United States Patent
Hohteri et al.

(10) Patent No.: US 9,202,526 B2
(45) Date of Patent: Dec. 1, 2015

(54) SYSTEM AND METHOD FOR VIEWING VIDEOS AND STATISTICS OF SPORTS EVENTS

(71) Applicant: Sstatzz Oy, Helsinki (FI)

(72) Inventors: Harri Hohteri, Helsinki (FI); Gavin Weigh, Helsinki (FI)

(73) Assignee: Sstatzz Oy, Helsinki (FI)

( * ) Notice: Subject to any disclaimer, the term of this patent is extended or adjusted under 35 U.S.C. 154(b) by 270 days.

(21) Appl. No.: 13/660,247

(22) Filed: Oct. 25, 2012

(65) Prior Publication Data

US 2013/0305156 A1   Nov. 14, 2013

Related U.S. Application Data

(63) Continuation-in-part of application No. 13/471,404, filed on May 14, 2012.

(51) Int. Cl.
| | |
|---|---|
| *G06F 3/00* | (2006.01) |
| *G11B 27/34* | (2006.01) |
| *G11B 27/10* | (2006.01) |
| *H04N 7/18* | (2006.01) |

(52) U.S. Cl.
CPC .............. *G11B 27/34* (2013.01); *G11B 27/105* (2013.01); *H04N 7/188* (2013.01)

(58) Field of Classification Search
CPC ............................ H04N 5/44543; G11B 27/34
USPC ........... 715/719, 723; 348/157; 386/241, 278; 707/752
See application file for complete search history.

(56) References Cited

U.S. PATENT DOCUMENTS

| | | | |
|---|---|---|---|
| 6,380,933 | B1 | 4/2002 | Sharir |
| 6,710,713 | B1 | 3/2004 | Russo |
| 6,950,123 | B2 | 9/2005 | Martins |
| 7,499,077 | B2 | 3/2009 | Li |
| 7,620,466 | B2 | 11/2009 | Neale |

(Continued)

FOREIGN PATENT DOCUMENTS

| | | |
|---|---|---|
| EP | 2150057 A2 | 2/2010 |
| EP | 2515548 A1 | 10/2012 |

(Continued)

OTHER PUBLICATIONS

Extended European Search Report, EP Application No. 13187645.0-1906, mailed Jan. 7, 2014.

(Continued)

*Primary Examiner* — Haoshian Shih
(74) *Attorney, Agent, or Firm* — Ziegler IP Law Group, LLC

(57) ABSTRACT

A portable computing device for enabling user to view video content of sports activity such as basketball or ice hockey. The computing device is configured to receive video content, video clips, statistics of the game as well as spatial position data of players and position data of for example a ball used in the game as functions of time. Spectators can use the portable computing device to view spatial position of the players and the ball at given time of the game or view spatial position of the players and/or the ball based on set filters by the user. User can for example select to see spatial position of players in at the times when the team scored or according to other statistics. The user/spectator can use the user interface to select an icon of a player to see corresponding video clip of actions in the sports field.

19 Claims, 10 Drawing Sheets

(56) References Cited

U.S. PATENT DOCUMENTS

| | | |
|---|---|---|
| 8,279,051 B2 | 10/2012 | Khan |
| 8,289,185 B2 | 10/2012 | Alonso |
| 2007/0135243 A1 | 6/2007 | LaRue |
| 2008/0089666 A1 | 4/2008 | Aman |
| 2008/0129825 A1 | 6/2008 | DeAngelis |
| 2008/0140233 A1 | 6/2008 | Seacat |
| 2008/0192116 A1 | 8/2008 | Tamir |
| 2009/0082110 A1* | 3/2009 | Relyea et al. ............ 463/42 |
| 2009/0111582 A1 | 4/2009 | Schuler |
| 2009/0262137 A1 | 10/2009 | Walker |
| 2010/0030350 A1 | 2/2010 | House |
| 2010/0092155 A1* | 4/2010 | Inagaki et al. ............ 386/96 |
| 2010/0134614 A1 | 6/2010 | Aman |
| 2011/0071792 A1 | 3/2011 | Miner |
| 2011/0105226 A1 | 5/2011 | Perlman |
| 2011/0194730 A1 | 8/2011 | Rhoads |
| 2011/0304497 A1 | 12/2011 | Molyneux |
| 2012/0057852 A1 | 3/2012 | Devleeschouwer |
| 2012/0058845 A1 | 3/2012 | Crowley |
| 2012/0249831 A1* | 10/2012 | Porter ............ 348/231.3 |
| 2012/0271440 A1 | 10/2012 | Lunner |
| 2013/0051757 A1* | 2/2013 | Shahraray et al. ........ 386/241 |

FOREIGN PATENT DOCUMENTS

| | | |
|---|---|---|
| WO | 95/08816 A1 | 3/1995 |
| WO | 99/57900 A1 | 11/1999 |
| WO | 02/09833 A1 | 2/2002 |

OTHER PUBLICATIONS

International Search Report and Written Opinion of the International Searching Authority; PCT/IB2013/053882; Oct. 30, 2013.
Anonymous: "GPS tracking Unit—Wikipedia, the free encyclopedia", Apr. 5, 2013, XP055140038, retrieved from the internet: URL:http://en.wikipedia.org/w/index.php?title=GPS_tracking_unit&oldid=54887452 [retrieved on Sep. 15, 2014], 6 pages.
Extended European Search Report; EP App. No. 14162990.7; dated Oct. 9, 2014, 9 pages.

* cited by examiner

SYSTEM AND METHOD FOR VIEWING VIDEOS AND STATISTICS OF SPORTS EVENTS

CROSS-REFERENCE TO RELATED APPLICATIONS

This application is a continuation-in-part of, claims priority to, and the benefit of U.S. application Ser. No. 13/471,404, filed on 14 May 2012, which is now pending, the disclosure of which is incorporated herein by reference in its entirety.

BACKGROUND

The aspects of the present disclosure generally relate to systems for automatic video filming and broadcasting of sports events. Moreover, the aspects of the present disclosure also concerns methods of automatic video filming and broadcasting of sports events.

Many popular games, for example soccer, basketball, cricket, baseball, are played globally. When played, most of these games, whether at national or international level, are broadcasted, to be shown as live telecasts to spectators. Currently, video filming of most of the sports events is executed in a substantially manual manner, requiring many people to be employed, for example cameramen, which continuously capture motion pictures of different regions of a playing area, and corresponding activities of different players involved in the sports events. For example, during video filming of a soccer match played upon a soccer field, different cameramen are active through different regions around the soccer field, and they continuously capture motion pictures of players' activities; some cameramen are dedicated to following a soccer ball continuously, as the match progresses. Moreover, there are also cameramen who are dedicated to identifying and capturing most interesting events during the match, and some people are involved in editing the captured video for delivering content corresponding to those interesting events to spectators. Furthermore, events such as goals, penalties and fouls, are often given special attention during video filming of soccer match. Additionally, different viewers of the soccer field may have different priorities, for example watching activities of specific players of the soccer match, or specific moves, as the soccer match progresses.

Efficient collaboration of personnel involved in video filming of a sports event is important for achieving satisfactory broadcasting of the sports event to the spectators, for example in an interesting manner. Moreover, a major problem arising with contemporary approaches when executing video filming of sports event is a need to employ numerous people, for example cameramen, video-clip editors and statistical data collectors, who must collaborate effectively for video filming of the sports events. Furthermore, customization of the video content corresponding to the sports event for rendering it suitable spectator viewing, pursuant to desires and preferences different spectators, is another problem.

Therefore, there arises a need for an effective system and method for video filming of sports events, which can reduce a need to employ numerous different people when executing video filming and associated editing. Moreover, there arises a need for the recorded video content to be customizable pursuant to needs of different categories of viewers, who wish to concentrate on different aspects of the recorded sports events.

SUMMARY

The present disclosure is concerned with a method and a system for automatically capturing motion pictures of a sports event in a field, wherein the sports event is to be viewed by spectators. In the disclosure, one or more high definition cameras are operable to capture video content of an entire field in which the sports event is undertaken, and all post-processing activities thereafter, for example editing, panning and zooming, are implemented automatically through mutual collaboration of different components of the system.

In one aspect, the present disclosure provides a system for automating video filming and data collection associated with a sports activity occurring in a playing region. The system includes an imaging device that continuously generates video signals. The video signals represent a view of the playing region, players involved in the sports activity, and one or more projectiles associated with the sports activity. Examples of projectiles associated with sports activities include footballs, tennis balls, shuttlecocks, javelins and so forth. A position measuring arrangement continuously monitors and measures positions of the different players, and the one or more projectiles within the playing region, and generates position signals that indicate these measured positions as a function of time. A data processor is coupled to the imaging device and the position measuring arrangement. The data processor receives the position signals and the video signals, analyzes the position signals for editing the video signals, and generates an edited output video content. Multiple transmitters, for example one per player, are coupled to the players involved in the sports activity, and a set of detectors are positioned at appropriate locations around the playing region. The transmitters send signals representing the spatial positions of the different players, to the detectors, and these signals are used, at least partially, to generate the edited output video content.

In another aspect, the present disclosure provides a method of automatically providing video filming and collecting data associated with a sports activity occurring in a playing region. The method involves continuously generating video signals corresponding to the players and one or more projectiles associated with the sports activity. The method further includes measuring spatial positions of one or more players, and generating position signals that indicate the spatial positions as a function of time. The position signals are analyzed to edit the video signals, for generating an edited output video content. The method and system of the present disclosure substantially automate video filming of a sports event, and eliminate a need for different people to collaborate and execute dedicated activities for video filming of the sports event. Moreover, the recorded video content is optionally customizable pursuant to preferences of different categories of viewers, for example spectators, who can define a set of rules to modify the video content.

Additional aspects, advantages, features and objects of the present disclosure are apparent from the drawings and the detailed description of illustrative embodiments construed in conjunction with the appended claims that follow.

DETAILED DESCRIPTION OF ILLUSTRATIVE EMBODIMENTS

The following detailed description discloses aspects of the claimed invention and the ways it can be implemented. However, the description is not intended to define or limit the invention, such definition or limitation being solely contained in the claims appended thereto. Although the best mode of carrying out the invention has been disclosed comprehensively, those in the art would recognize that other embodiments for carrying out or practicing the invention are also possible.

Sports such as baseball, cricket, soccer, basketball, etc. are popularly played in different parts of the World. For example, the game soccer is actively played and watched by spectators in many countries around the World. During special tournaments, including the World Cup and some league matches, millions of spectators watch live telecasts of matches on televisions. Video filming of any sports game involves multiple cameramen positioned to capture a continuous view of a corresponding game field and associated players, from different angles, to capture readily some special occurrences during the game, while conducting the live telecasting. Moreover, there are people involved in continuously collecting data pertaining to an ongoing game. For example, in a soccer game, this data may be team goals, the number of goals scored by each player, the number of penalties occurring, and fouls due to every player, and so forth. All this data is used to edit and render the final video content during telecasting. Major activities during video filming of a sports event are contemporarily implemented manually, for example through use of cameramen and statistical data collectors, etc. If the process of video filming of a sports event can be substantially automated, this would provide a benefit of reducing manual effort required and also make the process of generating video content much easier, with an additional benefit that the process can be utilized in different kinds of sports events.

The present disclosure elucidates a substantially automated method and system for video filming sports activities. The method and system can be implemented for different sports activities, including soccer, basketball, baseball, cricket, etc. The complexity of the system and the method, and the number of different components of the system collaborating for the video filming, may depend on several parameters, including the number of players involved in the game, the different aspects of the game, and the area of the playing field employed for executing the game.

Figure 1:
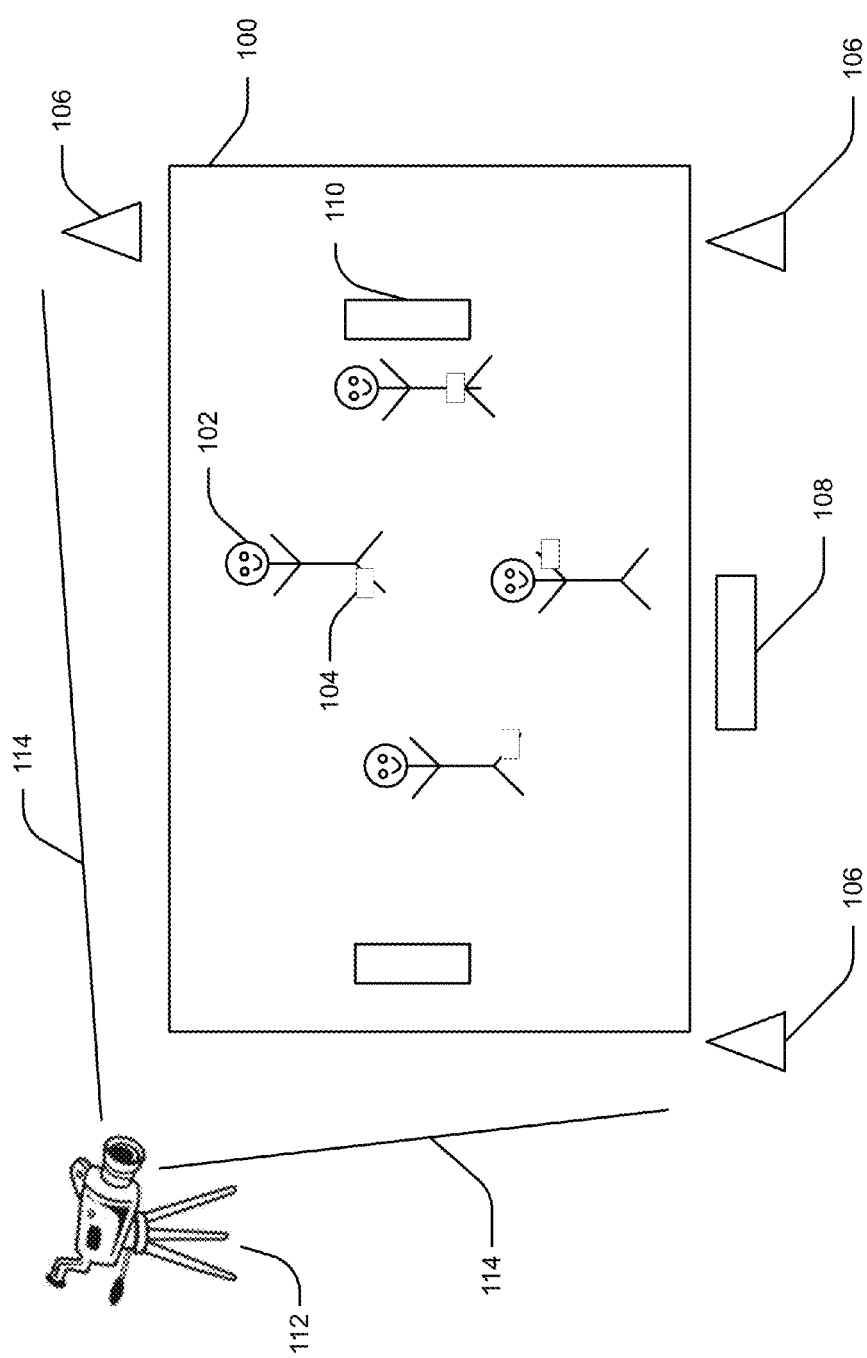
FIG. 1 illustrates a view of a game field, showing different players involved in a game, and a camera for continuously capturing the game field, in accordance with the present disclosure.

FIG. 1 shows a view of a field 100 having different players 102 involved in playing a game within the field 100. The game may be any one of the well-known games, including ice hockey, soccer, basketball, etc. Every player 102 associated with the game is equipped with a radio transmitter 104 attached to an appropriate portion of the player's body, for example ankle, shirt, shoes, etc. The radio transmitters 104 precisely locate the different players 102 in the field 100, by identifying their location coordinates, for example x, y, z coordinates with respect to a Cartesian coordinates system. Moreover, the transmitters 104 can be any suitable conventionally used transmitters, for identifying spatial positions of the different players 102. For example, low power Bluetooth transmitters can be utilized, which transmit data through low power radio wave emissions. Such transmitters typically work and communicate using a carrier frequency of about 2.45 GHz. Multiple bases stations 106 are located at different spatial locations around the field 100. The transmitters 104 are operable to communicate with these base stations 106, through a suitable communication network, which may be any wireless network, including wireless local area network (WLAN), Wi-Fi or a short range Bluetooth network. In a preferable embodiment, a triangulation technique is used to determine the locations of the different players 102 through use of their transmitters 104. Those skilled in the art would appreciate that the triangulation technique determines the location of any point by determining angles to the point from two known points on either side of a fixed baseline. However, other techniques, including trilateration, which measures the distance to a point directly, can also be used to identify the spatial positions of the different players.

One or more people operate through a desk 108, where they collect statistical data pertaining to the game continuously, as the game proceeds. The statistical data may include, for example, keeping updates of the time elapsed since the game started, tracking start and finishing of different phases of the game, operating time clock, names of each player, individual players' performances (for example, in soccer, a number of goals made by each player, penalities, free kicks, etc.). For collecting the statistical data pertaining to the game, the people operating through the desk 108 can use a laptop computer, a desktop computer, or any other suitable electronic device, including a smartphone, for example an iPhone; "iPhone" is a registered trademark. The collected statistical data can be stored within a hard disk of the electronic device used on the desk 108. Moreover, multiple such devices can be used to collect statistical data for the desk 108, depending on the complexity of the game being played, and each such device can be dedicated to collect specific category of data pertaining to the game. For example, if the game being played is soccer, one electronic device can be used to track and store data pertaining to the goals made by each player, another electronic device can be used to keep a continuous track of the time elapsed since the game started, the time for intermission, the time when the first goal was ever made, the number of goals made by both teams during specific predefined time periods, and so forth.

Multiple video cameras 112 are positioned at different spatial locations around the field 100. The cameras 112 to operable to continuously capture the video of the entire field 100, activities of the different players 102, and different events occurring during playing of the game. Many such cameras 112 are beneficially positioned at different spatial locations around the field 100 to ensure that none of the important activities occurring during the ongoing game are missed out. Moreover, the task of capturing the field 100 can be divided among different cameramen operating these cameras 112, logically, such that each camera 112 covers and continuously captures a specific region of the field 100, and has a predefined viewing angle within which it is dedicated to operate. This is beneficial to reduce the workload on each cameraman, and reduce the possibility of missing the capturing of certain special and important events, which are essential for broadcasting to spectators. For example, if the game is soccer, then one such camera 112 can be dedicated to capturing defenders of a particular team, one for capturing and monitoring mid-field players, and one of them may concentrate on continuously capturing activities proximal to goal areas on both sides of the field 100, and so forth. The cameras 112 employed for capturing the different portions of the field 100, are beneficially all high definition cameras, each having a high pixel resolution of about 2500×1500. In an embodiment, a single camera with a high resolution and having a substantially broad viewing angle, as shown being trapped between lines 114, can be used to cover the entire field 100.

Figure 2:
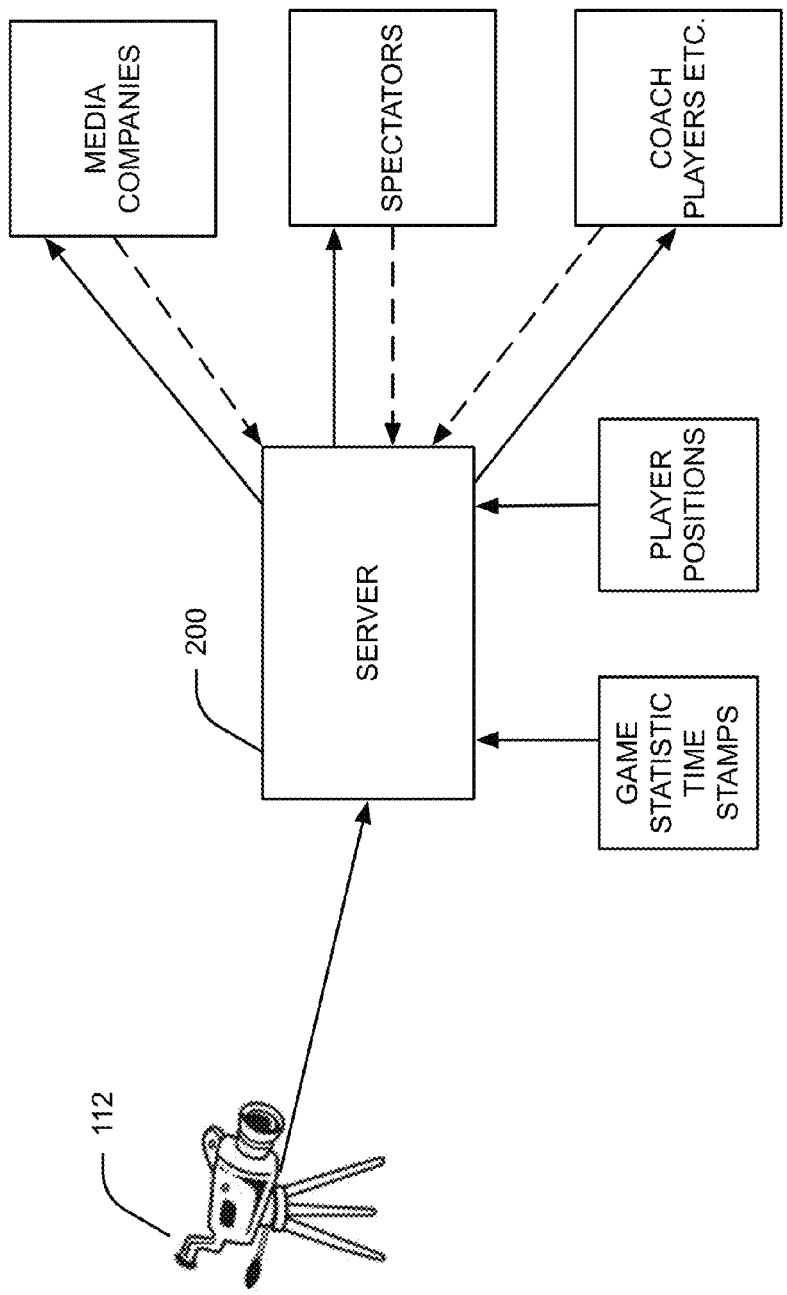
FIG. 2 illustrates a camera coupled to, and in communication with an automatic editing server, for editing the continuously captured videos of the players and the different activities occurring in the field of FIG. 1, in accordance with the present disclosure.

Referring now to FIG. 2, multiple servers 200 are coupled to, and are in communication with the camera 112. The servers 200 are configured to operate as automatic editing servers, and the camera 112 is operable to continuously record and send the captured content to these servers 200. In an embodiment, the different servers 200 are configured to operate remotely through a cloud computing environment, which involves delivering of hosted services over the Internet. The automatic editing servers 200 continuously receive the video content from one or more cameras 112. In a case where there are multiple such cameras 112, the cameras 112 are configured to capture the game field 100, and the servers 200 are coupled to each of these cameras 112, through a suitable wireless network, and receive the video content from all such cameras 112 continuously, as the game proceeds. Moreover, in an embodiment, the servers 200 are configured to receive content from different locations and games, to continuously receive data corresponding to different games going on at different locations. Furthermore, as shown, the servers 200 also receive other information, including the spatial positions of the different players of the game. For that matter, the transmitters coupled to the different players of the game, as illustrated earlier in FIG. 1, are coupled to the servers 200, and the transmitters continuously transmit position signals to the servers 200. The servers 200 also collect other relevant statistical data corresponding to the game, as aforementioned, within their databases. Specifically, the electronic devices operative at desk 108 shown in FIG. 1 are connected to the servers 200 through one or more suitable wireless networks, and these devices are operable continuously to update the servers 200 with the collected statistical data. Specifically, the servers 200 are continuously updated with information, for example information pertaining to the time elapsed since the game started, the number of goals made, the time left to play, etc., through a set of game statistics time stamps that they receive information from the desk 108. Moreover, different categories of spectators, including media companies and coaches, can store customized and pre-defined criteria/plans on the server 200, for watching different events within the recorded game, according to their specific priorities. Such stored criteria/plans can be executed through the server 200, while watching the recorded game on a display device.

These automatic editing servers 200 use the obtained information pertaining to the game, and edit the video content received from the cameras 112, for generating and rendering an edited video content to the spectators. Typically, the edited content, to be delivered for viewing by the spectators, has a resolution lower than the resolution at which the cameras 112 capture the video content. In a preferred embodiment, the edited video content to be rendered has a resolution of about 1280×720 pixels, which is significantly lower than the resolution at which the cameras 112 capture the content.

The system and method of the present disclosure, also use a set of pre-defined rules for editing, generating and rendering the output video content to the spectators. These pre-defined rules depend on factors such as the type of game being played, the complexity of the game, and the area of the game field, etc. Such rules are stored in the databases of one or more editing servers 200, wherein the rules are applied during editing operations. For example, if the game being played is soccer, one such rule pertains to the case when a goal is being made, when the camera is configured to zoom automatically to the player who made the goal, and the camera specifically focusses and captures a continuous picture of the player making the goal, for a pre-defined time period. In an embodiment, the camera follows the goal maker continuously for a period in a range of about 20 to 25 seconds before the goal is made, and then zooms directly for a period of about 10 seconds, to all the players involved in passing the ball, and eventually, towards the goal maker. Another such rule corresponds to the case of a penalty, where the camera finds the person who made the penalty, and zooms in towards the person, and the players around him, for a period in a range of about 10 to 15 seconds before the penalty occurred. In an embodiment, another such rule to be continuously followed while capturing the game is to show at least two or three players every time, and hence, always include two or more players in the video. Going further within this rule, a sub-rule is to zoom closer to the players when they are positioned closely, and zoom out if the players are spaced apart. Another rule is to focus on the regions of the game field close to the goal, and continuously track the activity of different players within that region, when the ball is close to the goal on either side.

Figure 3:
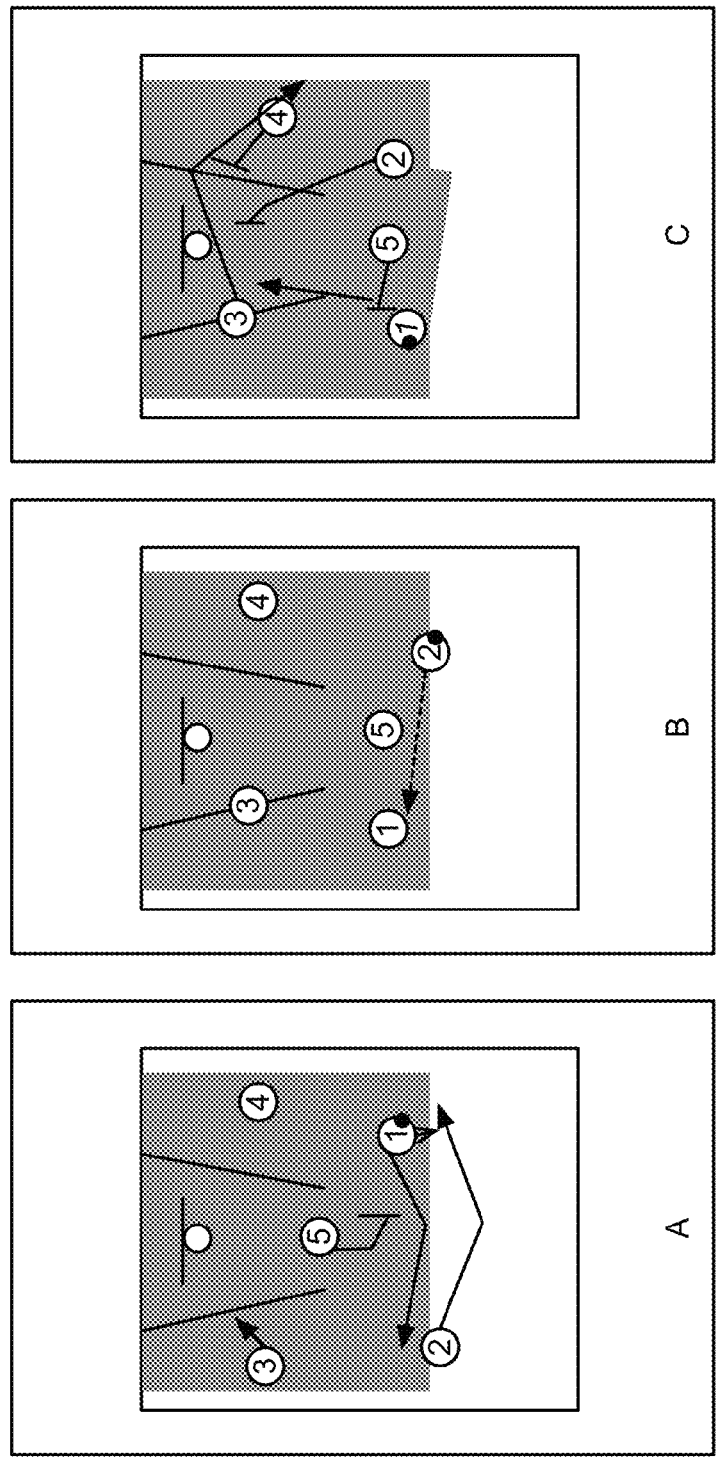
FIG. 3 illustrates a set of pre-defined rules following by the system and method for automatically video filming of a game, in accordance with the present disclosure.

There are also some special event rules to be followed in certain cases. This is explained now in conjunction with FIG. 3. The figure shows a pre-planned move of the players in the game through three different cases showing continuous succession in a pre-planned movement of players, specifically, case A, case B and case C. The plan starts with the case A, when a player 2 starts following and running towards and next to player 1. The player 1 passes the ball to the player 2, and starts moving from right to left, as shown in the case A. Following this, as shown in the case B, another player, namely a player 3, starts running to the center, and the player 2 passes the ball back to the player 1. The player 1 follows with the ball, and seeks for the appropriate time to shoot the ball into the goal. Eventually, the players 3, 5, 2 and 4 start moving simultaneously. The coach of the game, or any other viewer, can configure to seek for such a special movement, from the location database of the different players in the automatic editing server, for example as shown in FIG. 2.

Similarly, even the different spectators of the game, at their own end, can operate through the recorded video of the game, and edit the content based on their own desired preferences. A spectator can set his/her own rule for zooming in or out, concentrating on specific players, focusing and watching the moves of a specific player for some time, viewing specific events during the highlights, and so forth. In the same manner, the watching media companies can set their own business rules while editing and watching the recorded video content. Generically, any viewer can set his own rules for creating and watching a specific version of the recorded game. Such rules can be stored in the database of the automatic editing servers connected to the cameras capturing the view of the game field, as shown previously in FIG. 2. The databases can have a set of pre-defined default rules corresponding to the game type, which can be modified and redefined.

Figure 4:
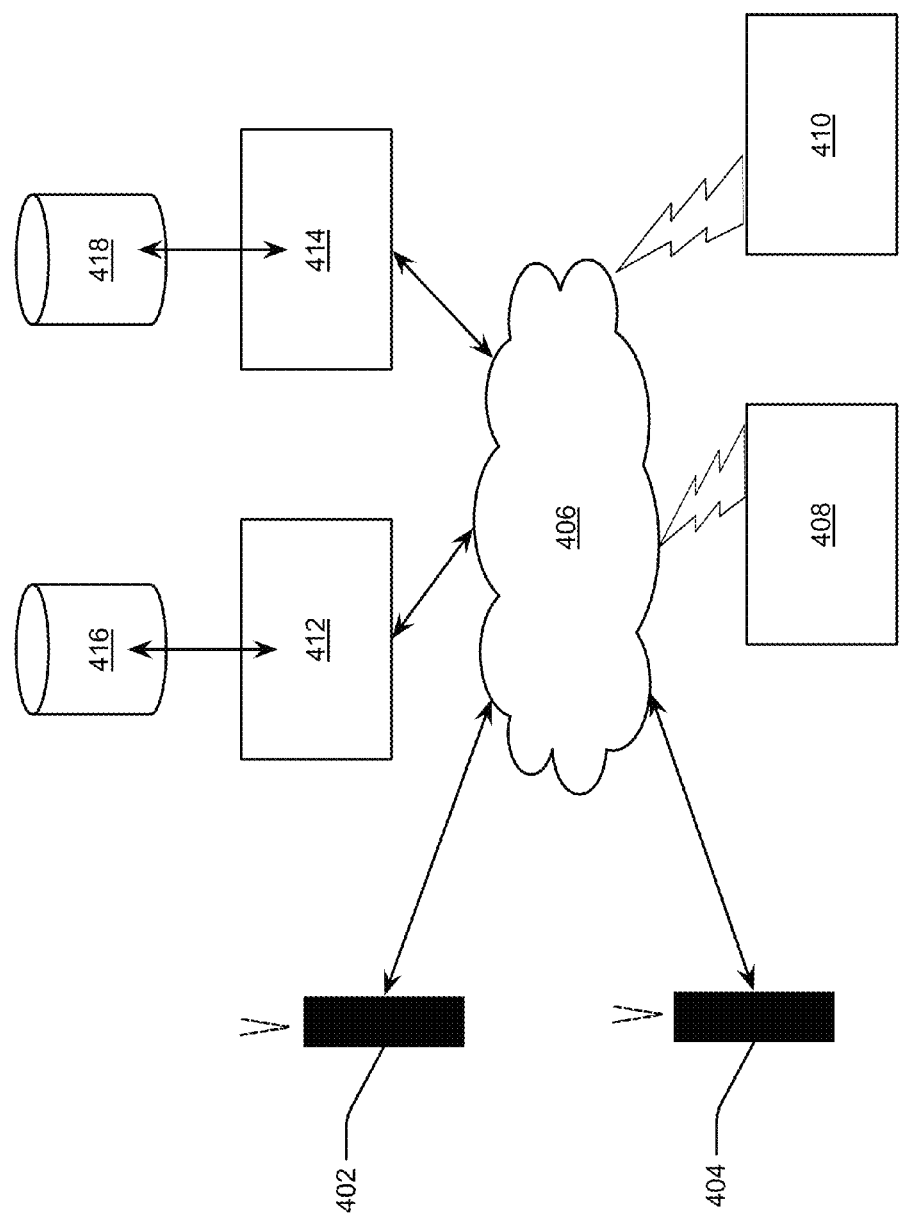
FIG. 4 illustrates an exemplary environment for implementing the system and method for automatically video filming a game, in accordance with the present disclosure

FIG. 4 shows an exemplary environment for supporting and implementing the method and system for automatically video filming an ongoing game in a field, according to the present disclosure. As shown, multiple transmitters 402, 404, and so on, are attached to suitable portions of the body of the different players to continuously track their spatial locations. The transmitters 402, 404 are connected to a set of automatic editing servers 412, 414, and so on, through a suitable communication network 406. The communication network 406 can be any appropriate network, including Wireless Local Area Network (WLAN), Wi-Fi, etc. The transmitters 402, 404, etc., are low-power Bluetooth transmitters, providing wireless transmission output, as noted previously, and can also be configured to be connected to the editing servers 412, 414 etc., through separate Bluetooth networks, with the help of base stations (though not shown). A set of electronic devices operate through the desks 408, 410, etc., and positioned at appropriate locations around the game field, collect and record statistical data pertaining to the game. The editing servers 412 and 414 have corresponding databases 416 and 418, respectively, at their back ends, for storing collected statistical data and information pertaining to the game. The transmitters 402, 402 continuously provide information pertaining to the spatial locations of the different players of the game, and this information is eventually stored in the databases of the editing servers 412 and 414. Moreover, the servers 412 and 414 are optionally cloud servers, operating remotely from the game field, as aforementioned.

Figure 5:
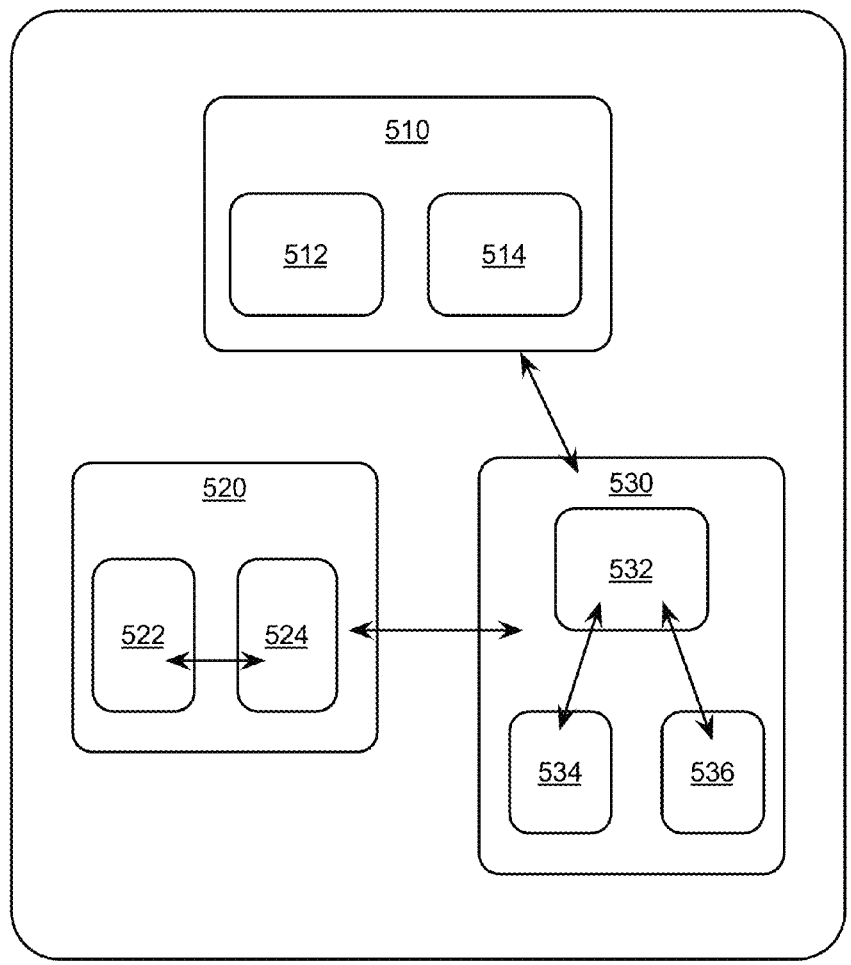
FIG. 5 illustrates different components of an exemplary system for automatically video filming a game occurring in a game field, in accordance with the present disclosure.

FIG. 5 shows a system for facilitating automatic video filming of a game occurring within a field. As shown, the system includes an imaging module 510 for continuously capturing the different portions of the game field, and the different events occurring therein. The imaging module 510 includes multiple imaging devices 512, 514, etc., positioned at different locations around the field, for continuously capturing the entire view of the field. The devices 512 and 514, etc., are high-definition video cameras, as aforementioned. Though two such devices have been shown, in an embodiment, a single high definition video camera having a wide viewing angle can also be used to capture the view of the entire field. A position measuring module 520 is shown (referred to as 'module 520' hereinafter, for simplicity and economy of expression), which continuously measures the spatial locations of the different players involved in the game. The module 520 includes multiple transmitters 522 coupled to multiple detectors 524. The transmitters 522 are coupled to suitable portions on the body of the players, to track their spatial locations. The transmitters 522 are beneficially also included within one or more projectiles used by the players when playing the game in the field; examples of the one or more projectiles associated with sports activities include footballs, tennis balls, shuttlecocks, javelins and so forth, depending upon a nature of the game. The detectors are positioned around the game field, to receive position signals from the transmitters 522. Preferably, the transmitters and receivers are wireless communication devices, communicating with each other through a suitable wireless network. A data processor 530 ('processor 530' hereinafter) is coupled to the position measuring module 520 and the imaging module 510. The processor 530 is operable to edit the video content captured by the imaging module 510, and generates the final content to be delivered for viewing by spectators. As shown, the processor 530 includes an editing module 532, and databases 534 and 536. The imaging module 510 continuously transmits video signals to the processor 530, and eventually, the video content captured by the imaging module 510 is continuously stored in databases 534 and 536. The spatial positions of the different players, as measured by the position measuring module 520, is communicated to the data processor 530 continuously, with time, and the databases 534 and 536 regularly update these spatial positions. Moreover, additional information pertaining to the game, including statistical data, is also stored in the databases 534 and 536. The statistical data is collected through different electronic devices configured to operate through desk arrangements positioned around the field (though not shown herein), as aforementioned. The editing module 532 retrieves all such information stored within the databases 534 and 536, uses this information to process the captured video content, and edits the captured content to generate an output video content, which is rendered for viewing by the spectators.

Figure 6:
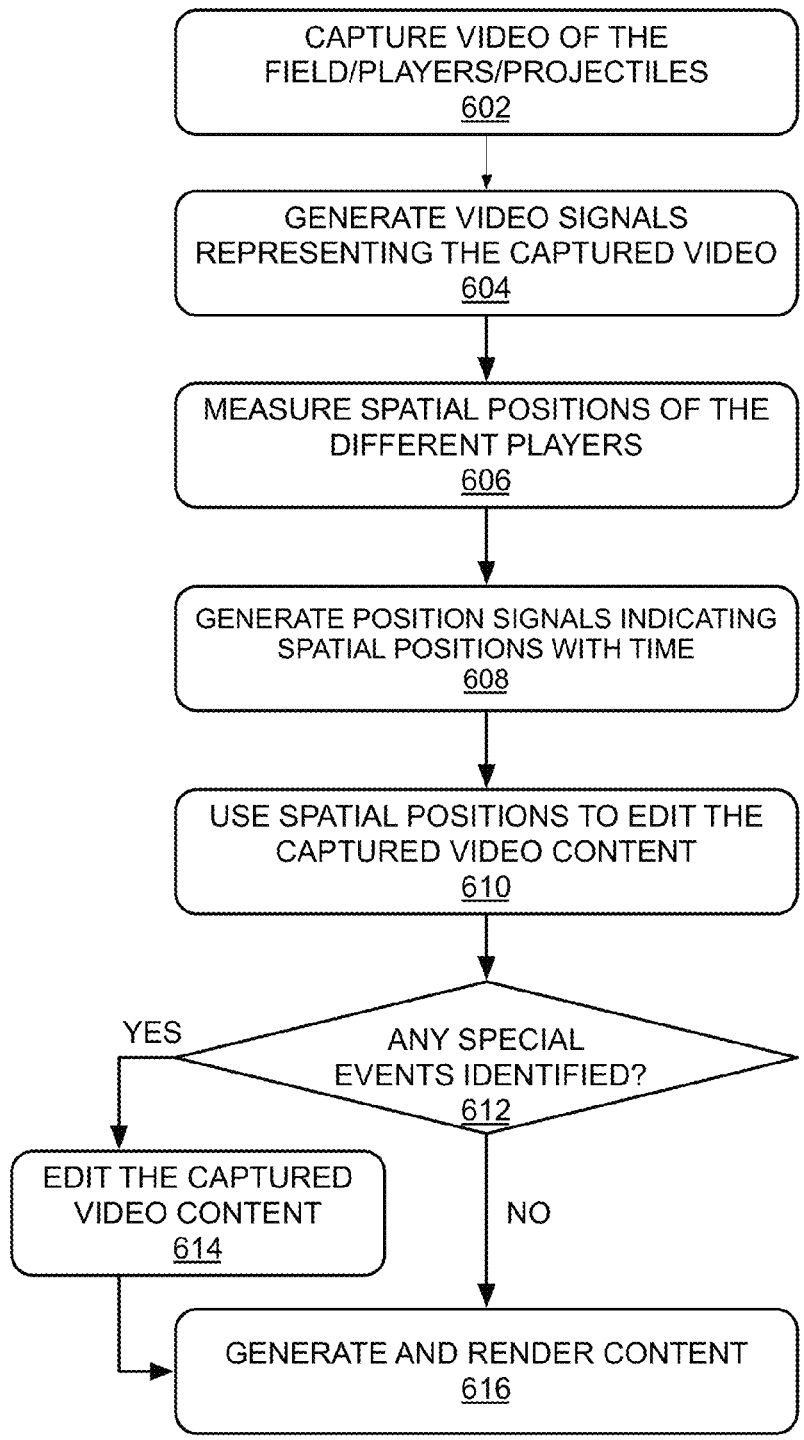
FIG. 6 illustrates different steps included in a method of automatically video filming a game occurring in a game field, in accordance with the present disclosure.

FIG. 6 is an illustration of steps of a method of automatically capturing and generating video filming of a game, according to the present disclosure. At a step 602, the method includes continuously capturing video of the game field, the players involved in the game, and one or more projectiles associated with the game; as aforementioned, examples of projectiles associated with sports activities include footballs, tennis balls, shuttlecocks, javelins and so forth. At a step 604, the method includes generating video signals corresponding to the content captured at the step 602. These signals are transmitted to a data processor, for processing the captured videos, as aforementioned. At a step 606, the method includes measuring the spatial positions of the different players of the game continuously, as the game proceeds. Wireless transmitters attached to the different players, communicate with wireless detectors positioned around the field, to continuously identity the locations of the different players, in terms of their spatial coordinates (for example, x, y, z Cartesian coordinates). Specifically, the method includes using triangulation techniques for detecting locations of the different players. However, in other less preferred embodiments, other techniques, including trilateration may also be used as an alternative. At a step 608, the method includes generating positions signals representing the locations of the different players, as the time lapses. These signals are also transmitted to the data processor (shown in FIG. 5). At a step 610, the spatial positions of the different players are used by the data processor, for processing the captured video content. At a step 612, the method includes checking and monitoring the occurrence of any special events pertaining to the game. For example, in a soccer game, such events may include capturing the goals being made, or identifying a sudden penalty, a granted free-kick, etc. Moreover, any special event rules which are pre-defined, and are directed by the user to be followed, such as tracking the movement of specific players, while the video content is being rendered, are also taken into consideration at the step 612. Detailed examples of such rules have been aforementioned in details, in conjunction with previous figures of the disclosure. If any such special event is being identified, then the method includes accordingly editing the captured video content at step 614. Following this, at step 616, the method includes generating and delivering the edited video content to the viewer. If no such special events are identified to happen at the step 612, the method includes continuing with delivering captured video content.

The method and system of the present disclosure, for automatically video filming a game and generating the content to be rendered to a viewer, can be implemented for many games commonly played today, including cricket, soccer, basketball, ice hockey, etc. Moreover, certain pre-defined rules, including the special event rules as described earlier, can be incorporated and used to customize the rendered video content, according to the viewer's desire.

Figure 7:
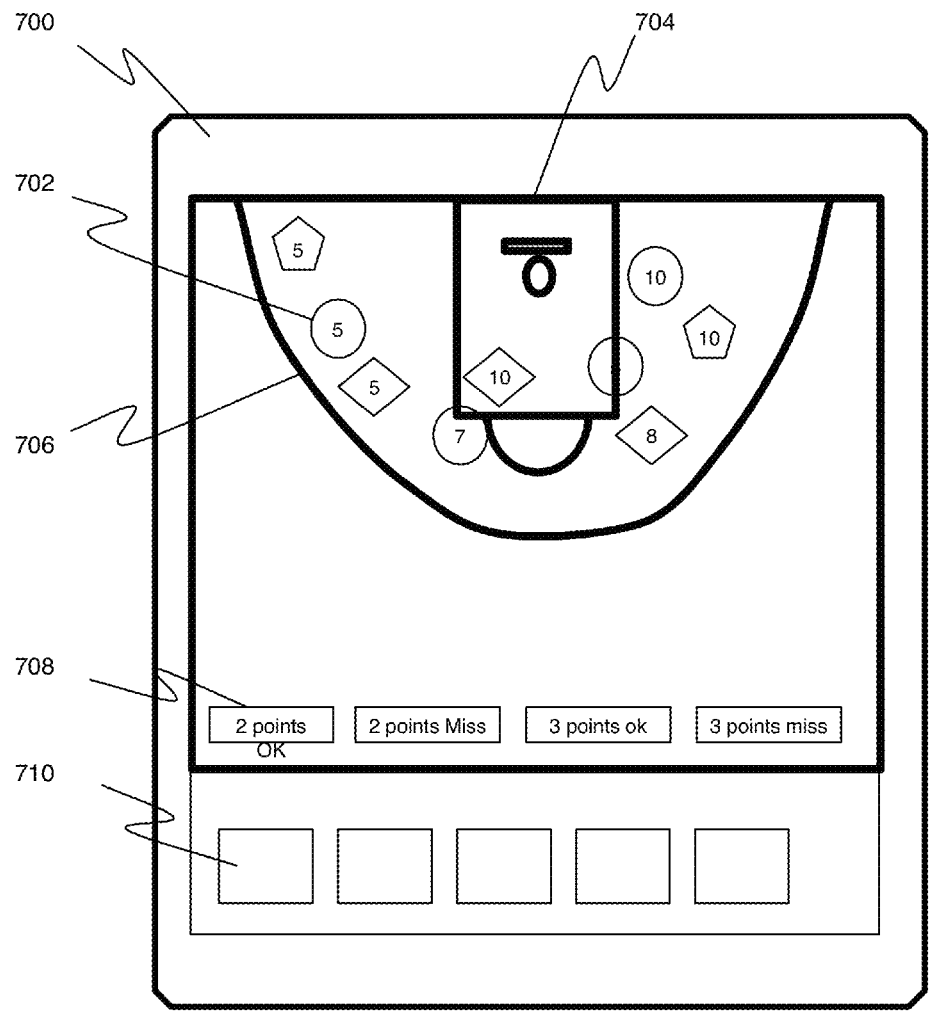
FIG. 7 illustrates example of user interface view, in accordance with the present disclosure.

According to an embodiment of the invention coaches or spectators can have a computing device or portable terminal 700, such as web pad or smart phone, as shown in FIG. 7. The portable terminal 700 has display 704, such as a graphical user interface, to show graphics to user of the terminal as well as provide input means (for example via touch screen) to control the terminal 700. In one embodiment, the display 704 is a touch screen or near touch screen device. FIG. 7 shows an examplary user interface for the game of basketball. The user interface presents a schematic layout or element of the playing area or field. In one embodiment, the schematic layout can include a playing field demarcation element or area, such as for example element 706 representing so called three-point line. In alternate embodiments, the schematic layout of the playing area can include any number of playing field demarcation elements, that will vary according to the particular game or sport being played, and can include for example, foul lines, goal lines, offside lines and center lines. The aspects of the disclosed embodiments are directed to determining a position of a player on the playing area relative to the demarcation element, and process actions of the player relative to the demarcation element 706 according to the rules of the particular game. For example, according to the rules of the basketball if a player throws ball inside said line 706 through the goal hoop-or basketball net-the team will be awarded with 2 points and if the player throws the ball into the basket from a point or position outside of the line 706 the team will be awarded with 3 points. Similarly, in the game of ice hockey, one or more of the center, red line, blue line, face off circles, hash marks, goal line and goal area can be presented as demarcation elements on the display 704. The actions of the players relative to each of these demarcation elements can also be recorded, monitored, and displayed, as is generally described herein.

The user interface further has set of filter buttons 708. In the example buttons are "2 points", "2 points miss", "3 points OK" and "3 points miss". The user of the terminal can select with touch screen or other input means the filter to be applied to the screen. In FIG. 7 user has selected buttons "2 points" and "2 points miss". As those are selected the user interface displays each player who have tried to make 2 points during the game and the position where the throw was done. In the FIG. 7 positions of the users 702 is shown. Circle represents position of player who made successful score (players 5, 7, 10), pentagons represent failed attempts (players 10, 8) and diagonal squares show position (5, 10, 8) of other players when the points were made.

The lower part of the user interface in the terminal 700 shows selectable links or thumbnails 710 of corresponding video clips. If user clicks for example icon 702 of player 5 a video is shown where the player 5 scores (makes points) from said position. The video could be for example last 10 seconds before the point is recorded until the point is made.

Figure 8:
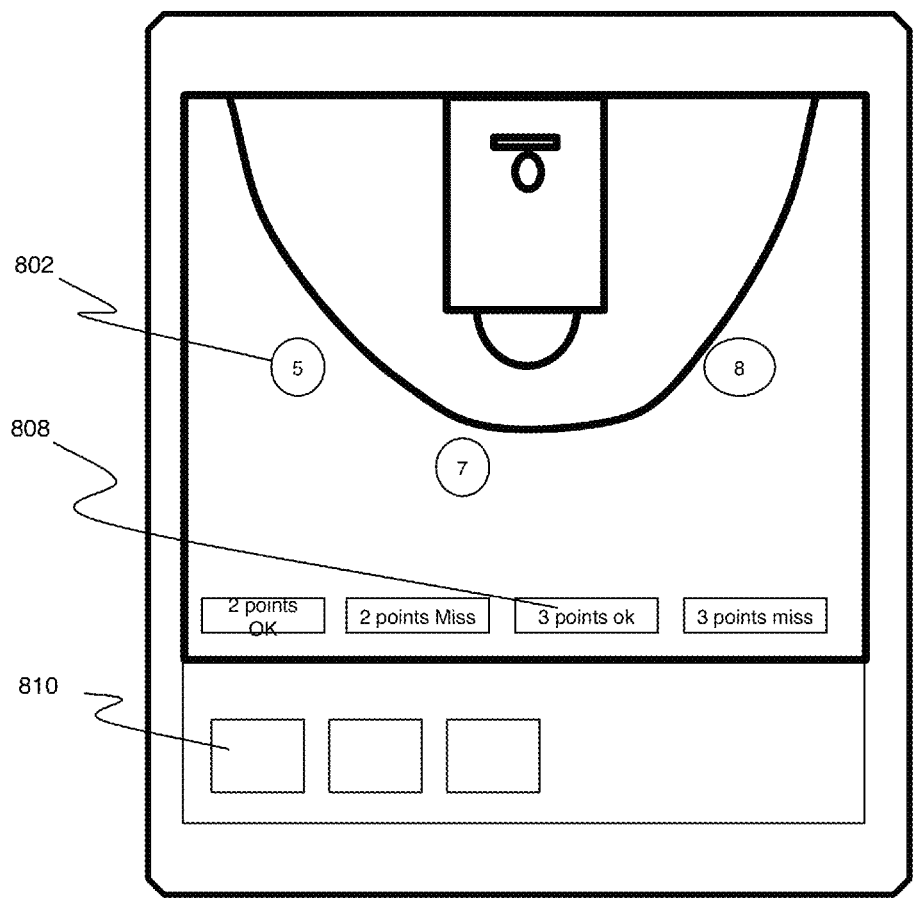
FIG. 8 illustrates second example user interface view, in accordance with the present disclosure.

Further (FIG. 8) if the user is interested to see only successful 3-point throws the user can select with buttons 808 "3 points OK" and the user interface would show icons 802 of players who were successful to score 3 points (players 5, 7 and 8). The user interface would display now a set of video links or thumbnails 810 of said throws in the lower part of the user interface.

In general the system can be configured so that users can either make arbitrary filters to find interesting clips of the sporting event or there can be set of ready made filters for the users. In certain embodiment the terminal can be configured to receive video clips according to set filters for said user. Example application for this could be to have "pod cast" type of service where user terminal downloads clips relating to the set filter automatically as the clip of certain type is available. Downloading of clips can be made over wireless local area network (Wi-Fi) or for example over cellular network. In alternative embodiment all video content is streamed all the time to the user terminal together with position data of players and the ball and statistics feed. The terminal can be configured to select clips for user locally depending on filter settings in the terminal. The terminals can be used in sports arena or remotely. One particular problem when using said system in sports arenas is possibility to run out of radio resources if a large amount of terminals download a clip or video or statistics at the same time. Based on embodiments such clips or other information which is needed by more than one person can be broadcast to the terminals using cellular broadcast, broadcast over Wi-Fi or for example using data broadcast over digital video broadcast for handheld standard (DVB-H) or similar or using Internet Protocol (IP) Multicast or IP Broadcast protocols.

Figure 9:
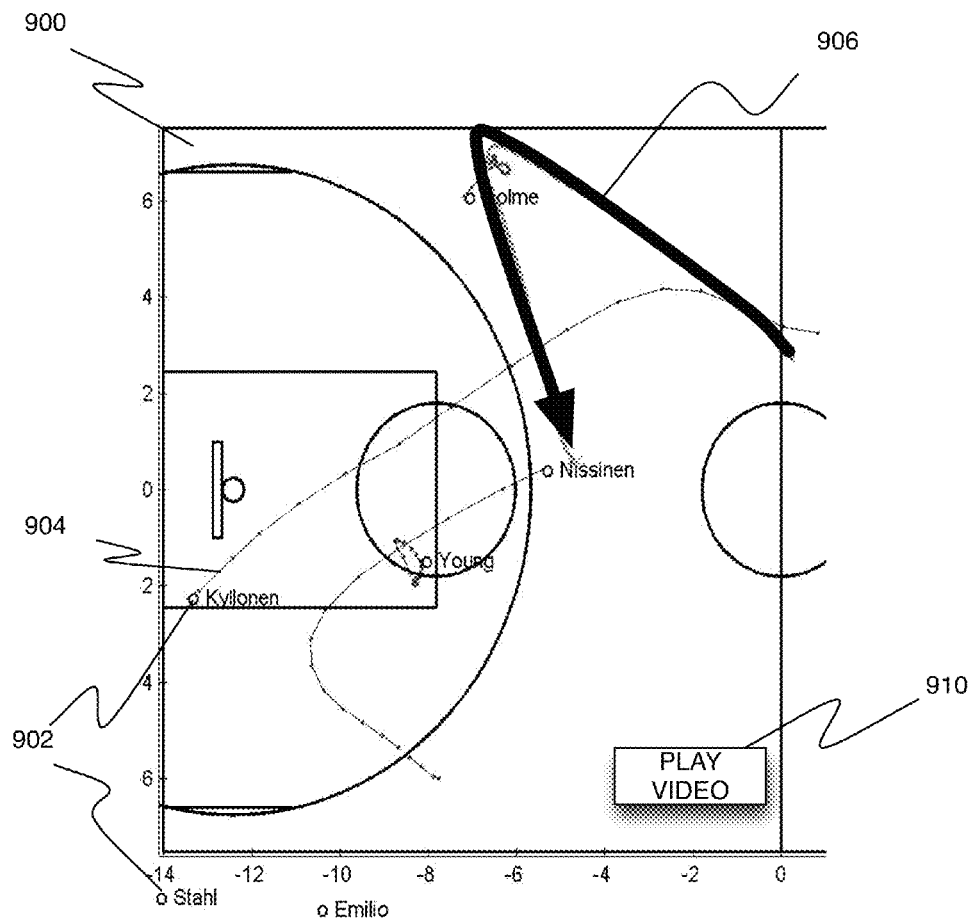
FIG. 9 illustrates third example user interface view, in accordance with the present disclosure.

FIG. 9 shows example of user interface according to other embodiment. The user interface can be configured to show the positions of the players 902 at selected moment of time in the game. User interface can show the movement trajectories of the players 904 and movement trajectories of the ball 906 for last for example 5 seconds. The user interface can be configured to initiate video of the said last 5 seconds by pressing play the video button 910.

Figure 10:
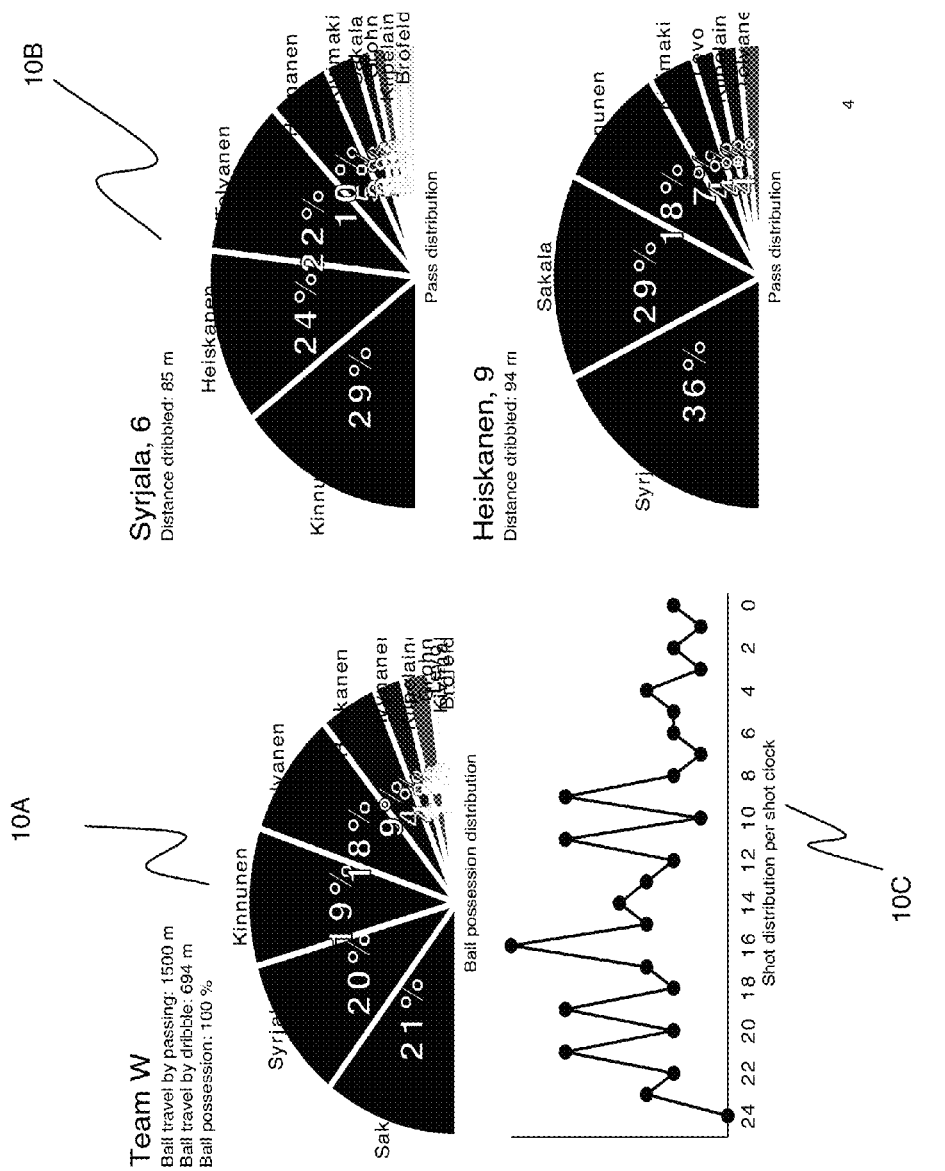
FIG. 10 illustrates user interface for showing some game statistics of basketball game.

Further more the system can be configured to collect automatically statistics of player movements and other actions. Example statistic views are shown in FIG. 10. For example in basket ball the system can be configured to monitor distance travelled by passing the ball or the distance travelled by dribbling. For example the team W managed to move ball by passing 1500 meters during the game (graph 10A) and by dribbling 694 meters. Statistics can be used to show for example how many % each player has ball in possession as shown in 10A.

Statistics can be collected per player or per team. Additionally statistics such as shot distribution as function of shot clock can be collected as shown in FIG. 10C. Shot distribution as function of shot clock can be collected due to configuration which takes in account time when the shot clock is started and recorded statistic of shot (success or not success) Additional statistics such as pass distribution (to which players the ball is passed) can be collected using the sensors and game time (or absolute time) related statistics as shown in 10B. In example 10B Syrjala has passed ball to player Heiskanen 24% of the total passes.

Although the current invention has been described comprehensively, in considerable details to cover the possible aspects and embodiments, those skilled in the art would recognize that other versions of the invention may also be possible.

What is claimed is:

1. A computing device having a display device associated therewith, comprising:
   an application program window presented on the display device, the application window being generated by an application program operating on the computing device, the application program window concurrently including at least a first sub-window and a second sub-window displayed on the display device associated with the computing device;
   wherein the first sub-window displays first content received by the application program from a server over a network, the first content comprising a display element representing a playing area and includes one or more selectable player elements representing positions of players on the playing area at a point in time;

the first sub-window having one or more filter buttons for pre-selected scoring activities and for graphically displaying in the playing area, positions of only those player elements associated with a selected scoring activity and player success or failure indications at each displayed position; and wherein the second sub-window displays second content received from the server over the network upon selecting at least one of the displayed player elements associated with the selected scoring activity, the second content comprising a selectable link to a video content corresponding to the selected player element performing the selected scoring activity.

2. The computing device of claim 1, wherein the display element of the playing area corresponds to an activity involving one or more players.

3. The computing device of claim 2, wherein the activity is a sport activity.

4. The computing device of claim 2, wherein multiple player elements are presented on the display element relative to a point in time.

5. The computing device of claim 4, wherein each player element is presented on the display element relative to their position on the playing area at the point in time.

6. The computing device of claim 5, wherein the display element continuously tracks and presents a position of each player on the playing area relative to time.

7. The computing device of claim 5, wherein the display element is configured to present a relative movement of each player on the playing area relative to time.

8. The computing device of claim 1, wherein the display element includes multiple player elements, each player element being uniquely identified.

9. The computing device of claim 1, wherein the first content includes at least one playing field demarcation element representing an area on the playing area; and each player element is presented relative to the at least one playing field demarcation element.

10. The computing device of claim 1, wherein the success or failure indications are determined by a rule associated with the selected scoring activity.

11. The computing device of claim 10, wherein the rule corresponds to an action on the playing area by one or more players.

12. The computing device of claim 1, wherein selection of one of the one or more filter buttons relocates each player position element to a position on the playing area corresponding to a rule associated with the selected filter button.

13. The computing device of claim 1, wherein selection of one of the one or more filter buttons reshapes each player filter element that pertains to a rule associated with the selected filter button.

14. The computing device of claim 1, wherein selection of one of the one or more filter elements applies a rule to a recorded video content of the selected scoring activity, and a position of each player element pertaining to the rule at different points in time of the selected scoring activity are presented on the display device.

15. The computing device of claim 10, wherein selection of one of the one or more filter buttons causes:
the first content to present only those player elements on the display device pertaining to the rule;
the second content to present links to video content for the player elements pertaining to the rule; and
wherein selection of one of the player elements pertaining to the rule causes the display device to present the corresponding video content on the display device.

16. The computing device of claim 1, wherein multiple player elements are presented on the display device and the second content comprises multiple links to video content, each link corresponding to a specific player at a specific point in time.

17. The computing device of claim 16, wherein selection of a player element presents a video content from the second content on the display device, the video content pertaining to the player corresponding to the selected player element.

18. The computing device of claim 1, wherein the first content includes a game playing element, the game playing element being positioned on the display element relative to a position on the playing field at a point in time.

19. The computing device of claim 1, wherein the computing device comprises an electronic pad device, an electronic tablet device, a computer, a smart phone, an electronic organizer, a personal digital assistant, a portable terminal or a mobile communication device.

\* \* \* \* \*